(12) United States Patent
Pandian

(10) Patent No.: US 11,421,463 B2
(45) Date of Patent: Aug. 23, 2022

(54) ONE-WAY CLUTCH FOR USE IN A NO-BACK CLUTCH DESIGN

(71) Applicant: Hamilton Sundstrand Corporation, Charlotte, NC (US)

(72) Inventor: Navaneethakrishnan Pandian, Karnataka (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 343 days.

(21) Appl. No.: 16/681,249

(22) Filed: Nov. 12, 2019

(65) Prior Publication Data
US 2021/0071461 A1    Mar. 11, 2021

(30) Foreign Application Priority Data
Sep. 9, 2019  (IN) .............................. 201911036313

(51) Int. Cl.
*E05F 11/00* (2006.01)
*E05F 15/60* (2015.01)
(Continued)

(52) U.S. Cl.
CPC .............. *E05F 15/60* (2015.01); *B64D 29/06* (2013.01); *F16C 19/10* (2013.01); *F16C 19/46* (2013.01);
(Continued)

(58) Field of Classification Search
CPC ........ F16D 67/02; F16D 41/069; F16D 7/005; F16D 45/00; F16C 2361/43; F16C 19/46;
(Continued)

(56) References Cited

U.S. PATENT DOCUMENTS

| 4,834,225 | A | | 5/1989 | Klopfenstein |
| 4,878,567 | A | * | 11/1989 | Buckley ................. B60K 23/04 192/18 R |

(Continued)

FOREIGN PATENT DOCUMENTS

| CA | 1233133 A | 2/1988 |
| WO | 2019149312 A1 | 8/2019 |

OTHER PUBLICATIONS

European Search Report Application No. EP19212591; dated Jun. 8, 2020; pp. 7.

*Primary Examiner* — Chi Q Nguyen
(74) *Attorney, Agent, or Firm* — Cantor Colburn LLP

(57) ABSTRACT

An actuator is provided and includes first and second shafts, a friction plate affixed to the second shaft, a one-way clutch that includes an inner diameter portion affixed to the first shaft, an outer diameter portion and a one-way clutch portion interposed between the inner and output diameter portions and a bearing. The bearing is disposed such that a compressive load path is formed from the first shaft, through the bearing and the outer diameter portion and to the friction plate and the second shaft. The one-way clutch portion is configured for free-wheeling during forward rotation of the first shaft that permits forward rotation transmission to the second shaft and for jamming during reverse rotation of the first shaft to create a drag event on the friction plate that inhibits reverse rotation transmission to the second shaft.

14 Claims, 3 Drawing Sheets

(51) Int. Cl.
*B64D 29/06* (2006.01)
*F16C 19/10* (2006.01)
*F16C 19/46* (2006.01)
*F16D 41/069* (2006.01)
*F16D 67/02* (2006.01)

(52) U.S. Cl.
CPC ........... *F16D 41/069* (2013.01); *F16D 67/02* (2013.01); *E05Y 2201/26* (2013.01); *E05Y 2201/434* (2013.01); *E05Y 2201/628* (2013.01); *E05Y 2900/502* (2013.01); *F16C 2361/43* (2013.01)

(58) Field of Classification Search
CPC .......... F16C 19/10; B64D 29/06; E05F 15/60; E05Y 2201/628; E05Y 2201/434; E05Y 2900/502; E05Y 2201/26
USPC ......... 49/324, 327, 356, 330, 360, 352, 349; 475/338
See application file for complete search history.

(56) References Cited

U.S. PATENT DOCUMENTS

| | | | | |
|---|---|---|---|---|
| 4,923,040 | A * | 5/1990 | Buckley | F16D 67/02 |
| | | | | 192/111.1 |
| 5,289,908 | A * | 3/1994 | Hakon | B21J 9/18 |
| | | | | 192/113.23 |
| 5,630,490 | A * | 5/1997 | Hudson | F16D 43/208 |
| | | | | 188/134 |
| 6,622,963 | B1 | 9/2003 | Ahrendt et al. | |
| 8,011,136 | B2 * | 9/2011 | Fukumura | E05F 15/646 |
| | | | | 49/360 |
| 8,393,236 | B1 * | 3/2013 | Hauser | F16D 55/24 |
| | | | | 74/15.4 |
| 9,188,025 | B2 | 11/2015 | Calder et al. | |
| 9,366,201 | B2 | 6/2016 | Caruel | |
| 9,587,421 | B1 * | 3/2017 | Harrison | B60J 5/10 |
| 11,067,156 | B1 * | 7/2021 | Heiberger | F16D 13/52 |
| 11,149,803 | B1 * | 10/2021 | Morales | F16D 41/069 |
| 2007/0163179 | A1 * | 7/2007 | Fukumura | H02K 7/116 |
| | | | | 49/360 |
| 2017/0275010 | A1 | 9/2017 | Pretty et al. | |
| 2019/0112859 | A1 * | 4/2019 | Cumbo | F16H 1/28 |
| 2020/0240484 | A1 * | 7/2020 | Hur | F16D 67/02 |

* cited by examiner

ONE-WAY CLUTCH FOR USE IN A NO-BACK CLUTCH DESIGN

CROSS REFERENCE TO RELATED APPLICATION

This application claims the benefit of Indian Patent Application No. 201911036313, filed Sep. 9, 2019, which is incorporated herein reference in its entirety.

BACKGROUND

The following description relates to clutches and, more specifically, to a one-way clutch that is based on a no-back design.

No-back clutches are used to resist back driving torques that are generated due to compressive loads on an actuator employing an efficient screw configuration (i.e., ACME/ball). They can be used in various applications, such as electric powered nacelle door opening systems (PDOSs).

No-back clutches typically include a spring loaded pawl and a ratchet with a friction disk. The pawl and ratchet exhibit free-wheel rotation during forward motion and locks itself during reverse motion. When the pawl and ratchet of a no-back clutch locks, the pawl and ratchet drags on a friction surface. This drag provides for resistance to reverse rotation.

BRIEF DESCRIPTION

According to an aspect of the disclosure, an actuator is provided and includes first and second shafts, a friction plate affixed to the second shaft, a one-way clutch that includes an inner diameter portion affixed to the first shaft, an outer diameter portion and a one-way clutch portion interposed between the inner and output diameter portions and a bearing. The bearing is disposed such that a compressive load path is formed from the first shaft, through the bearing and the outer diameter portion and to the friction plate and the second shaft. The one-way clutch portion is configured for free-wheeling during forward rotation of the first shaft that permits forward rotation transmission to the second shaft and for jamming during reverse rotation of the first shaft to create a drag event on the friction plate that inhibits reverse rotation transmission to the second shaft.

In accordance with additional or alternative embodiments, the first shaft includes an input shaft and the second shaft includes an output shaft.

In accordance with additional or alternative embodiments, the input shaft includes a central shaft portion and a screw flange extending radially outwardly from the central shaft portion.

In accordance with additional or alternative embodiments, the output shaft is coupled to a nacelle door of an aircraft engine.

In accordance with additional or alternative embodiments, the one-way clutch portion includes a sprag clutch.

In accordance with additional or alternative embodiments, the bearing includes a thrust bearing.

In accordance with additional or alternative embodiments, the bearing includes a needle roller bearing.

In accordance with additional or alternative embodiments, the bearing includes a ball bearing.

In accordance with additional or alternative embodiments, a plate element is interposed between the outer diameter portion and the friction plate.

According to an aspect of the disclosure, an actuator is provided and includes input and output shafts, a friction plate affixed to the output shaft, a one-way clutch that includes an inner diameter portion affixed to the input shaft, an outer diameter portion and a one-way clutch portion interposed between the inner and output diameter portions and a bearing. The bearing is disposed such that a compressive load path is formed from the input shaft, through the bearing and the outer diameter portion and to the friction plate and the output shaft. The one-way clutch portion is configured for free-wheeling during forward rotation of the input shaft to thereby permit rotation of the input shaft in the forward direction to be transmitted to the output shaft and for jamming during reverse rotation of the input shaft to create a drag event on the friction plate to thereby inhibit rotation of the input shaft in the reverse direction to be transmitted to the output shaft.

In accordance with additional or alternative embodiments, the input shaft includes a central shaft portion and a screw flange extending radially outwardly from the central shaft portion.

In accordance with additional or alternative embodiments, the output shaft is coupled to a nacelle door of an aircraft engine.

In accordance with additional or alternative embodiments, the one-way clutch portion includes a sprag clutch.

In accordance with additional or alternative embodiments, the bearing includes one or more of a thrust bearing, a needle roller bearing and a ball bearing.

In accordance with additional or alternative embodiments, a plate element is interposed between the outer diameter portion and the friction plate.

According to an aspect of the disclosure, an actuator of an electric powered nacelle door opening system (PDOS) including a nacelle door of an aircraft engine is provided. The actuator includes an input shaft, an output shaft coupled to the nacelle door, a friction plate affixed to the output shaft, a one-way clutch including an inner diameter portion affixed to the input shaft, an outer diameter portion and a one-way clutch portion interposed between the inner and output diameter portions and a bearing. The bearing is disposed such that a compressive load path is formed from the input shaft, through the bearing and the outer diameter portion and to the friction plate and the output shaft. The one-way clutch portion is configured for free-wheeling during forward rotation of the input shaft to thereby permit rotation of the input shaft in the forward direction to be transmitted to the output shaft and for jamming during reverse rotation of the input shaft to create a drag event on the friction plate to thereby inhibit rotation of the input shaft in the reverse direction to be transmitted to the output shaft.

In accordance with additional or alternative embodiments, the input shaft includes a central shaft portion and a screw flange extending radially outwardly from the central shaft portion.

In accordance with additional or alternative embodiments, the one-way clutch portion includes a sprag clutch.

In accordance with additional or alternative embodiments, the bearing includes one or more of a thrust bearing, a needle roller bearing and a ball bearing.

In accordance with additional or alternative embodiments, a plate element is interposed between the outer diameter portion and the friction plate.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a one-way clutch for use in a no-back clutch design is provided. The one-way clutch can be used in place of a pawl and ratchet mechanism to drag on a friction disk when reverse rotation occurs.

Figure 1:
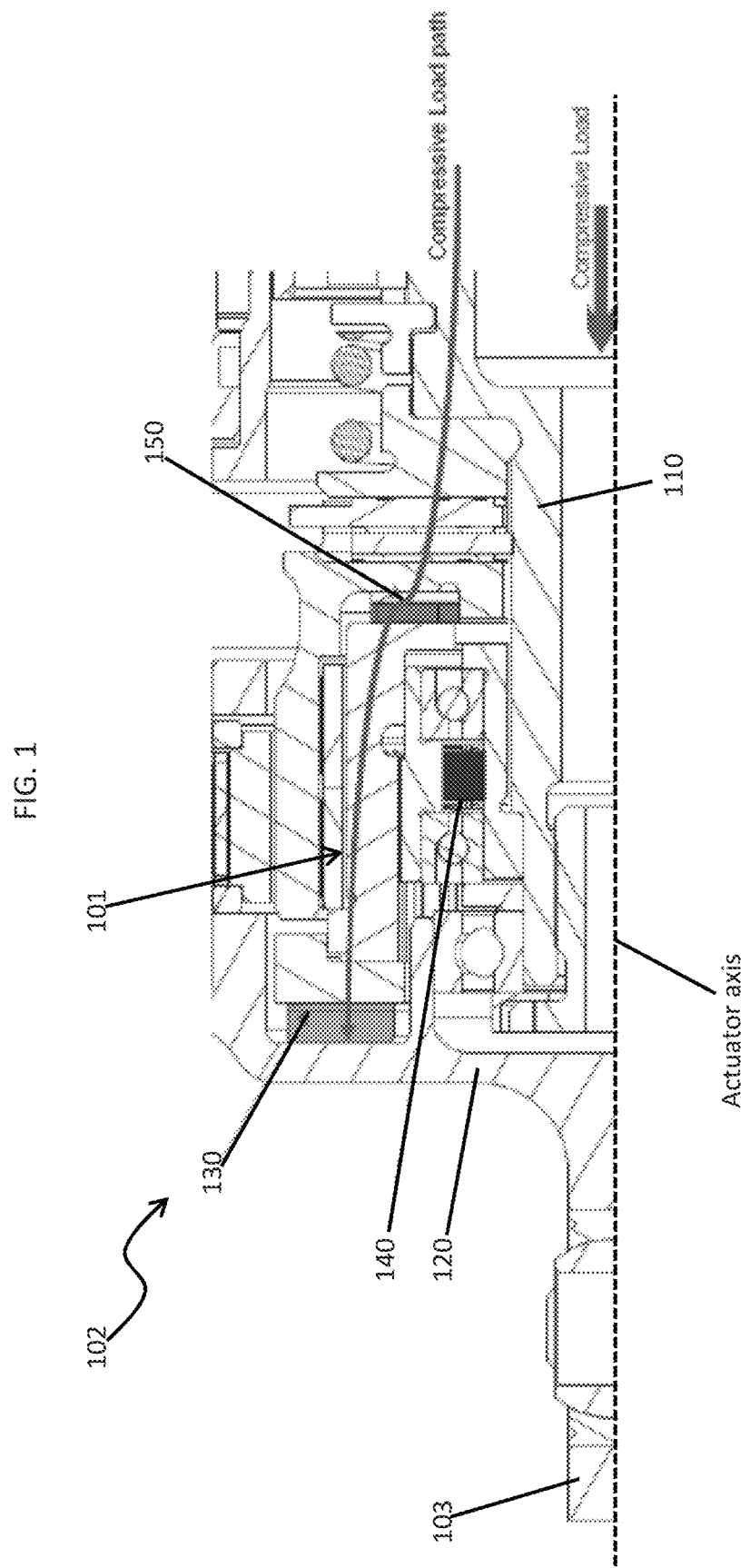
FIG. 1 is a side view of an electric powered nacelle door operating system (PDOS) in accordance with embodiments.

With reference to FIG. 1, an actuator 101 is provided for use in an electric powered nacelle door opening system (PDOS) 102, which includes a nacelle door 103 of an aircraft engine. The actuator 101 includes a first or input shaft 110 (hereinafter referred to as an "input shaft 110"), a second or output shaft 120 (hereinafter referred to as an "output shaft 120") that is coupled to the nacelle door 103, a friction plate 130 that is affixed to the output shaft 120, a one-way clutch 140 and a bearing 150.

Figure 2:
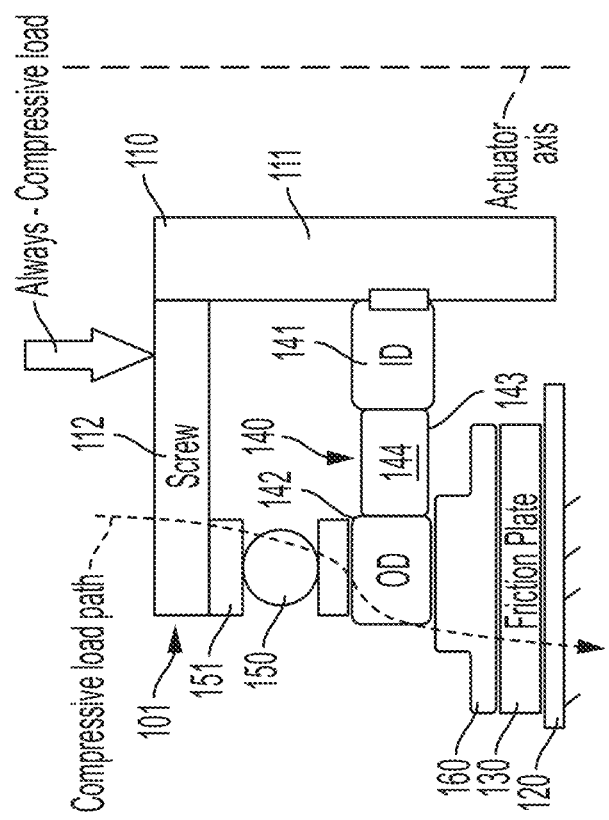
FIG. 2 is a schematic illustration of a one-way clutch based on a no-back design in accordance with embodiments.
Figure 4:
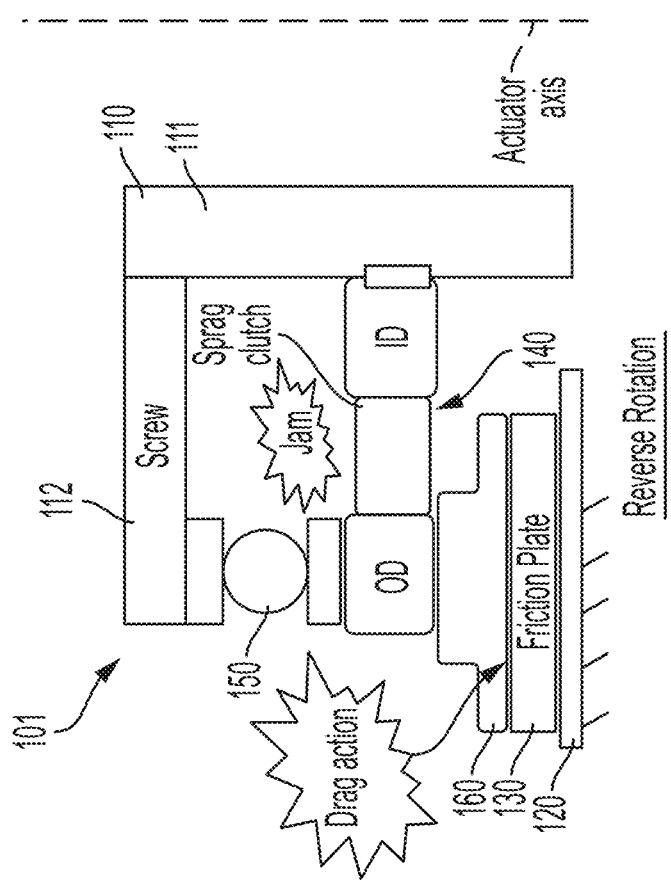
FIG. 4 is a schematic illustration of an operation of the one-way clutch of FIG. 2 during reverse rotation.
Figure 3:
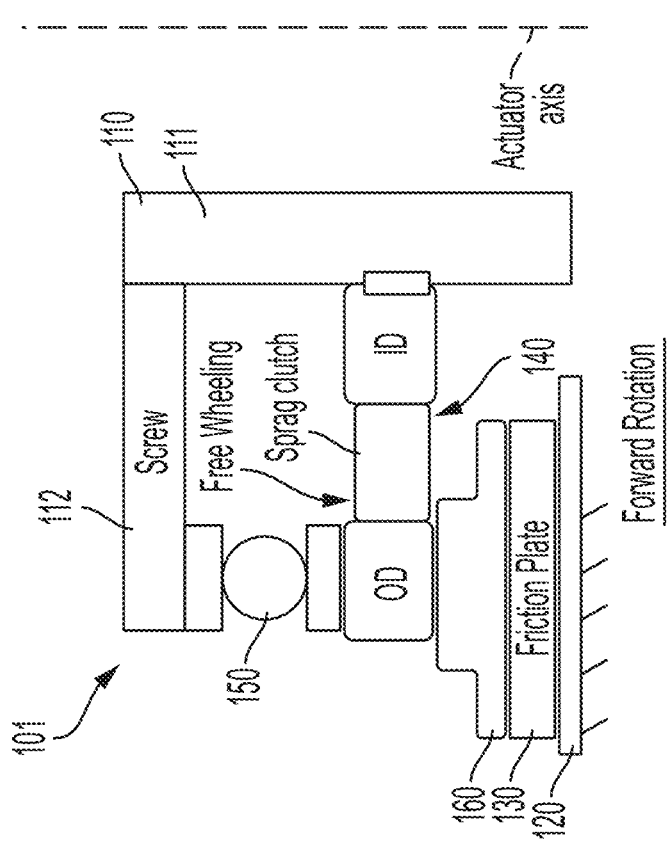
FIG. 3 is a schematic illustration of an operation of the one-way clutch of FIG. 2 during forward rotation.

With reference to FIGS. 2-4, further details of the actuator 101 of FIG. 1 will be described. As shown in FIGS. 2-4, the input shaft 110 includes a central shaft portion 111 and a screw flange 112 extending radially outwardly from the central shaft portion 111. The central shaft portion 111 extends along a longitudinal axis that is defined in parallel with an actuator or rotational axis such that the input shaft 110 is rotatable in forward and reverse directions about the actuator axis to drive movements of the nacelle door 103 (see FIG. 1). The one-way clutch 140 includes an inner diameter portion 141 that is affixed to the central shaft portion 111 of the input shaft 110, an outer diameter portion 142 and a one-way clutch portion 143 that is radially interposed between the inner diameter portion 141 and the output diameter portion 142. A plate element 160 can be axially interposed between the outer diameter portion 142 of the one-way clutch 140 and the friction plate 130.

The bearing 150 is disposed such that a compressive load path (see FIGS. 1 and 2) is formed and defined to extend from the screw flange 112 of the input shaft 110, through the bearing 150, through the outer diameter portion 142 of the one-way clutch 140 and through the plate element 160 and to the friction plate 130 and the output shaft 120. The compressive load path refers to a pathway through the actuator 101 by which compressive loads, which are always present during operational conditions of the actuator 101, are transmitted and absorbed. The compressive loads result in back-driving torques being generated in the actuator 101.

In accordance with embodiments, the one-way clutch portion 143 can include or be provided as a sprag clutch 144 and the bearing 150 can include or be provided as one or more of one or more of a thrust, needle roller and a ball bearing 151.

As shown in FIGS. 3 and 4, the one-way clutch portion 143 is disposed and configured for free-wheeling operation during forward rotation of the input shaft 110 (see FIG. 3) and for jamming operation during reverse rotation of the input shaft 110 (see FIG. 4) that may be caused by the back-driving torques generated by the compressive loads. The free-wheeling operation of the one-way clutch portion 143 serves to permit rotation of the input shaft 110 in the forward direction to be transmitted to the output shaft 120. By contrast, the jamming operation of the one-way clutch portion 143 serves to create a drag event on the friction plate 130 to thereby inhibit rotation of the input shaft 110 in the reverse direction to be transmitted to the output shaft.

Technical effects and benefits of the one-way clutch for use in the no-back clutch design results in a compact configuration with a reduced number of components, reduced weight and reduced costs.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An actuator, comprising:
an input shaft comprising a central shaft portion and a screw flange extending radially outwardly from the central shaft portion;
an output shaft;
a friction plate affixed to the output shaft;
a one-way clutch comprising an inner diameter portion affixed to the central shaft portion, an outer diameter portion and a one-way clutch portion interposed between the inner and outer diameter portions; and
a bearing disposed between the screw flange and the outer diameter portion such that a compressive load path is formed from the screw flange, through the bearing and the outer diameter portion and to the friction plate and the second shaft,
the one-way clutch portion interposed between the inner and outer diameter portions being configured for free-wheeling during forward rotation of the first shaft that permits forward rotation transmission to the second shaft and for jamming during reverse rotation of the first shaft to create a drag event on the friction plate that inhibits reverse rotation transmission to the second shaft.

2. The actuator according to claim 1, wherein the one-way clutch portion comprises a sprag clutch.

3. The actuator according to claim 1, wherein the bearing comprises a thrust bearing.

4. The actuator according to claim 1, wherein the bearing comprises a needle roller bearing.

5. The actuator according to claim 1, wherein the bearing comprises a ball bearing.

6. The actuator according to claim 1, further comprising a plate element interposed between the outer diameter portion and the friction plate.

7. An actuator, comprising:
- an input shaft comprising a central shaft portion and a screw flange extending radially outwardly from the central shaft portion;
- an output shaft;
- a friction plate affixed to the output shaft;
- a one-way clutch comprising an inner diameter portion affixed to the central shaft portion, an outer diameter portion and a one-way clutch portion interposed between the inner and output diameter portions; and
- a bearing disposed between the screw flange and the outer diameter portion such that a compressive load path is formed from the screw flange, through the bearing and the outer diameter portion and to the friction plate and the output shaft,
- the one-way clutch portion being configured for freewheeling during forward rotation of the input shaft to thereby permit rotation of the input shaft in the forward direction to be transmitted to the output shaft and for jamming during reverse rotation of the input shaft to create a drag event on the friction plate to thereby inhibit rotation of the input shaft in the reverse direction to be transmitted to the output shaft.

8. The actuator according to claim 7, wherein the one-way clutch portion comprises a sprag clutch.

9. The actuator according to claim 7, wherein the bearing comprises one or more of a thrust bearing, a needle roller bearing and a ball bearing.

10. The actuator according to claim 7, further comprising a plate element interposed between the outer diameter portion and the friction plate.

11. An actuator of an electric powered nacelle door opening system (PDOS) comprising a nacelle door of an aircraft engine, the actuator comprising:
- an input shaft comprising a central shaft portion and a screw flange extending radially outwardly from the central shaft portion;
- an output shaft coupled to the nacelle door;
- a friction plate affixed to the output shaft;
- a one-way clutch comprising an inner diameter portion affixed to the central shaft portion, an outer diameter portion and a one-way clutch portion interposed between the inner and output diameter portions; and
- a bearing disposed between the screw flange and the outer diameter portion such that a compressive load path is formed from the screw flange, through the bearing and the outer diameter portion and to the friction plate and the output shaft,
- the one-way clutch portion being configured for freewheeling during forward rotation of the input shaft to thereby permit rotation of the input shaft in the forward direction to be transmitted to the output shaft and for jamming during reverse rotation of the input shaft to create a drag event on the friction plate to thereby inhibit rotation of the input shaft in the reverse direction to be transmitted to the output shaft.

12. The actuator according to claim 11, wherein the one-way clutch portion comprises a sprag clutch.

13. The actuator according to claim 11, wherein the bearing comprises one or more of a thrust bearing, a needle roller bearing and a ball bearing.

14. The actuator according to claim 11, further comprising a plate element interposed between the outer diameter portion and the friction plate.

* * * * *